(12) United States Patent
Tokuyama et al.

(10) Patent No.: US 11,818,659 B2
(45) Date of Patent: Nov. 14, 2023

(54) CONTROL DEVICE, WIRELESS COMMUNICATION DEVICE, WIRELESS SYSTEM, AND POWER SUPPLY CONTROL METHOD

(71) Applicant: ICOM INCORPORATED, Osaka (JP)

(72) Inventors: Yukihiro Tokuyama, Osaka (JP); Yasuhiro Nishiguchi, Osaka (JP); Kosuke Yabumoto, Osaka (JP)

(73) Assignee: ICOM INCORPORATED, Osaka (JP)

( * ) Notice: Subject to any disclaimer, the term of this patent is extended or adjusted under 35 U.S.C. 154(b) by 211 days.

(21) Appl. No.: 17/558,760

(22) Filed: Dec. 22, 2021

(65) Prior Publication Data
US 2022/0240188 A1    Jul. 28, 2022

(30) Foreign Application Priority Data

Jan. 25, 2021    (JP) .................................. 2021-009807

(51) Int. Cl.
| | | |
|---|---|---|
| *H04W 52/02* | (2009.01) | |
| *H04W 4/80* | (2018.01) | |
| *H04L 1/00* | (2006.01) | |
| *H04W 84/12* | (2009.01) | |

(52) U.S. Cl.
CPC ....... *H04W 52/0235* (2013.01); *H04L 1/0025* (2013.01); *H04W 4/80* (2018.02); *H04W 52/0229* (2013.01); *H04W 52/0277* (2013.01); *H04W 52/0212* (2013.01); *H04W 84/12* (2013.01)

(58) Field of Classification Search
CPC ........ H04W 4/30–80; H04W 76/00–45; H04L 1/0025
See application file for complete search history.

(56) References Cited

U.S. PATENT DOCUMENTS

| | | | | |
|---|---|---|---|---|
| 2005/0047356 A1* | 3/2005 | Fujii | ..................... | G06F 1/3246 370/311 |
| 2009/0119526 A1* | 5/2009 | Liu | ........................ | G06F 1/3228 713/323 |
| 2012/0214418 A1* | 8/2012 | Lee | ........................ | G06F 1/3209 455/522 |
| 2014/0052832 A1* | 2/2014 | Dina | .................... | B23K 9/1087 709/224 |
| 2015/0312857 A1* | 10/2015 | Kim | .................... | H04W 52/028 370/311 |
| 2022/0131410 A1* | 4/2022 | Benbuk | ................. | H02J 50/402 |

FOREIGN PATENT DOCUMENTS

JP    2005018377 A    1/2005

* cited by examiner

*Primary Examiner* — San Htun
(74) *Attorney, Agent, or Firm* — Ohlandt, Greeley and Perle, LLP

(57) ABSTRACT

A wireless system includes a control device and a wireless communication device. The control device switches between a control-side access point mode and a control-side station mode. In the control-side access point mode, the control device receives a connection request from the wireless communication device to establish a connection and, in the control-side station mode sends a connection request to the wireless communication device to establish a connection. The control device sends a sleep command or a wake-up command to the wireless communication device with which the connection is established.

14 Claims, 10 Drawing Sheets

CONTROL DEVICE, WIRELESS COMMUNICATION DEVICE, WIRELESS SYSTEM, AND POWER SUPPLY CONTROL METHOD

CROSS-REFERENCE TO RELATED APPLICATION

This application claims the benefit of Japanese Patent Application No. 2021-009807, filed on Jan. 25, 2021, the entire disclosure of which is incorporated by reference herein.

FIELD

The present disclosure relates generally to a control device, a wireless communication device, a wireless system, and a power supply control method.

BACKGROUND

Communication systems include a plurality of communication terminals that are connected across a network. The power supply of each of the communication terminals is controlled remotely to reduce power consumption, carry out maintenance work, and the like of the plurality of communication terminals. For example, sending to each communication terminal connected to a wired Local Area Network (LAN) a wake-up command by using a function called Wake on LAN (WoL) enables to wake up each communication terminal from sleep mode. Likewise, sending to each communication terminal connected to a wireless LAN a wake-up command by using a function called Wake on Wireless LAN (WoWLAN) enables to wake up each communication terminal from sleep mode. Unexamined Japanese Patent Application Publication No. 2005-18377 describes an example of this type of wireless system.

In the wireless system described in Unexamined Japanese Patent Application Publication No. 2005-18377, when, in a state in which a main power supply of a system main body of a computer device is not turned ON, receiving means of the computer device receives, from an access point on the network, a frame including a magic packet commanding the power to be turned ON, the main power supply of the system main body is turned ON.

SUMMARY

A control device according to a first aspect of the present disclosure is a control device that controls a power supply of a wireless communication device connected across a wireless local area network, the control device including:

a control-side operation switcher that, in accordance with a power operation or a supply state of power from a power supply source that supplies power to the control device, switches between a control-side access point mode for receiving a connection request from the wireless communication device and a control-side station mode for sending a connection request to the wireless communication device;

a control-side power supply controller that, in accordance with the power operation or the supply state of the power from the power supply source, generates a sleep command commanding switching of the wireless communication device to a device-side sleep mode or a wake-up command commanding the wireless communication device to wake up from the sleep mode, and switches between a control-side sleep mode for limiting a supply of power within a range in which detection of the power operation is possible and a control-side wake-up mode; and a control-side communicator that receives a connection request from the wireless communication device in the control-side access point mode and sends a connection request to the wireless communication device in the control-side station mode to establish a connection with the wireless communication device, and sends, to the wireless communication device with which the connection is established, the sleep command or the wake-up command generated by the control-side power supply controller.

It is preferable that, when a power OFF of the control device is commanded by the power operation, the control-side power supply controller generates the sleep command, the control-side communicator sends, to the wireless communication device, the sleep command generated by the power supply controller, and after the control-side communicator sends the sleep command, the control-side power supply controller switches to the control-side sleep mode.

It is preferable that, when a power ON of the control device is commanded by the power operation, or supplying of power is started from a state in which power is not being supplied from the power supply source, the control-side power supply controller switches to the control-side wake-up mode and generates the wake-up command, the control-side operation switcher switches to the control-side station mode, after the control-side operation switcher switches to the control-side station mode, the control-side communicator sends the connection request to the wireless communication device and, when the connection with the wireless communication device is established, sends the wake-up command to the wireless communication device, and after the control-side communicator sends the wake-up command, the control-side operation switcher switches to the control-side access point mode.

A wireless communication device according to a second aspect of the present disclosure is a wireless communication device in which a power supply is controlled by a control device connected across a wireless local area network, the wireless communication device including:

a device-side operation switcher that, in accordance with a supply state of power from a power supply source that supplies power to the wireless communication device or a sleep command commanding switching to a device-side sleep mode or a wake-up command commanding waking up from the sleep mode sent from the control device, switches between a device-side access point mode for receiving a connection request from the control device and a device-side station mode for sending a connection request to the control device;

a device-side communicator that receives a connection request from the control device in the device-side access point mode and sends a connection request to the control device in the device-side station mode to establish a connection with the control device, and receives, from the control device with which the connection is established, the sleep command or the wake-up command; and a device-side power supply controller that, in accordance with the supply state of the power from the power supply source or the sleep command or the wake-up command, switches between the device-side sleep mode for limiting a supply of power within a range in which receiving of the connection request from the control device is possible and a device-side wake-up mode.

It is preferable that, when the device-side communicator receives the sleep command from the control device, the device-side operation switcher switches to the device-side access point mode, and after the device-side operation switcher switches to the device-side access point mode, the device-side power supply controller switches to the device-side sleep mode.

It is preferable that, when the device-side communicator receives the wake-up command from the control device, the device-side power supply controller switches to the device-side wake-up mode, and when the device-side power supply controller switches to the device-side wake-up mode, the device-side operation switcher switches to the device-side station mode.

It is preferable that, when supplying of power is started from a state in which power is not being supplied from the power supply source, the device-side power supply controller switches to the device-side wake-up mode, the device-side operation switcher switches to the device-side access point mode, and after the device-side operation switcher switches to the device-side access point mode, the device-side power supply controller switches to the device-side sleep mode.

A wireless system according to a third aspect of the present disclosure includes:

the control device; and at least one of the wireless communication device.

A power supply control method according to a fourth aspect of the present disclosure is a power supply control method performed by a wireless system including a wireless communication device and a control device connected over a wireless local area network, the method being for controlling a power supply of the wireless communication device, the method including:

in accordance with a power operation of the control device or a supply state of power from a power supply source that supplies power to the control device, sending a sleep command commanding switching to a device-side sleep mode to the wireless communication device from the control device that is operating in a control-side access point mode for receiving a connection request from the wireless communication device;

when the wireless communication device operating in a device-side station mode for sending a connection request to the control device receives the sleep command, switching the wireless communication device to a device-side access point mode for receiving a connection request from the control device, and switching the wireless communication device to the device-side sleep mode;

in accordance with the power operation of the control device or the supply state of the power from the power supply source, sending a wake-up command commanding wake up from the device-side sleep mode to the wireless communication device from the control device operating in a control-side station mode for sending a connection request to the wireless communication device; and when the wireless communication device operating in the device-side access point mode receives the wake-up command, switching the wireless communication device to the device-side station mode and switching the wireless communication device to the device-side wake-up mode.

The control device according to the present disclosure receives a connection request from the wireless communication device in the control-side access point mode and sends a communication request to the wireless communication device in the control-side station mode to establish a connection with the wireless communication device. The control device sends, to the wireless communication device with which the connection is established, a sleep command or a wake-up command to control the power supply of the wireless communication device. This configuration enables, even when the connection with the wireless communication device is cut off, to establish a connection with the wireless communication device and remotely control the power supply control of the wireless communication device.

BRIEF DESCRIPTION OF THE DRAWINGS

A more complete understanding of this application can be obtained when the following detailed description is considered in conjunction with the following drawings, in which.

DETAILED DESCRIPTION

Figure 1:
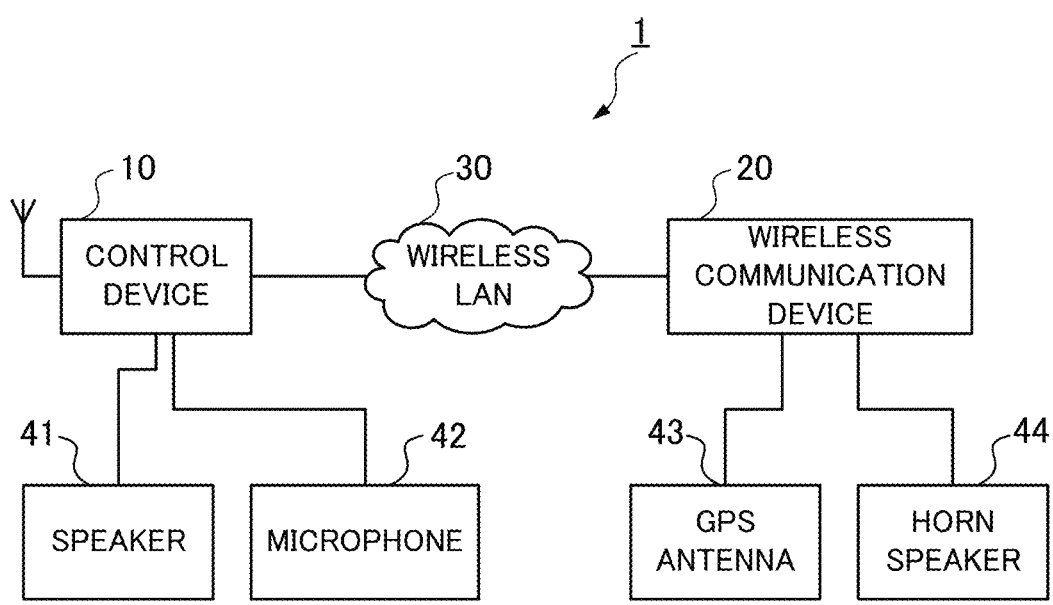
FIG. 1 is a block diagram illustrating the configuration of a wireless system according to an embodiment.

In the computer device of the wireless system described in Unexamined Japanese Patent Application Publication No. 2005-18377, power is supplied to the receiving means for receiving the frame including the magic packet, even in a state in which the main power supply of the system main body is not turned ON. Power is constantly supplied to the access point of the wireless system. Consequently, the connection that is established between the computer device and the access point after sending of a connection request from the computer device to the access point is maintained.

When the supplying of power to the computer device and the access point is stopped, the computer device and the access point stop, and the connection between the computer device and the access point is cut off. Restarting thereafter the supplying of power to the computer device and the access point does not enable sending the frame including the magic packet from the access point to the computer device, since the connection between the computer device and the access point is not established. Consequently, the main power supply of the system main body of the computer device cannot be turned ON remotely. This problem is not limited to computer devices that connect to access points, and may occur in various types of wireless communication devices that have power supplies that are controlled by control devices connected across wireless LANs.

The present disclosure is made with the view of the above situation, and an objective of the present disclosure is to provide a control device, a wireless communication device, a wireless system, and a power supply control method whereby, when a connection with a wireless communication device is cut off, the connection with the wireless communication device is reestablished, thereby enabling remote power supply control of the wireless communication device.

Hereinafter, a control device, a wireless communication device, a wireless system, and a power supply control method according to various embodiments are described in detail while referencing the drawings. Note that, in the drawings, identical or equivalent components are denoted with the same reference numerals.

A wireless system 1 illustrated in FIG. 1 includes a control device 10 and a wireless communication device 20. The control device 10 and the wireless communication device 20 are connected across a wireless Local Area Network (LAN) 30. Specifically, the wireless communication device 20 sends a connection request to the control device 10 to establish a connection between the control device 10 and the wireless communication device 20. In this embodiment, an example of the wireless system 1 is described in which the wireless system 1 is installed on a marine vessel, and the control device 10 is a Very High Frequency (VHF) radio station.

The control device 10 is provided in the wheelhouse, and the wireless communication device 20 is provided at a position separated from the control device 10 such as, for example, at the stern. Input/output devices such as, for example, a speaker 41 and a microphone 42 are connected to the control device 10. The microphone 42 is provided with operators such as a Push To Talk (PTT) switch that is pressed when transmitting, a switch for remote controlling the control device 10, and the like. External devices such as, for example, a Global Positioning System (GPS) antenna 43, and input/output devices such as, for example, a horn speaker 44 are connected to the wireless communication device 20.

In one example, the control device 10 extracts data from a VHF signal received from a VHF radio station installed on another marine vessel, and sends the extracted data to the speaker 41 and the wireless communication device 20. The speaker 41 outputs speech included in the data acquired from the control device 10. The wireless communication device 20 sends the data acquired from the control device 10 to the horn speaker 44. The horn speaker 44 outputs speech included in the data acquired from the wireless communication device 20.

Additionally, in one example, the control device 10 generates a VHF signal based on speech data acquired from the microphone 42, and sends the generated VHF signal to the VHF radio station installed on the other marine vessel. The control device 10 acquires, from the wireless communication device 20, data such as, for example, position information that the wireless communication device 20 acquires from the GPS antenna 43, and displays the position of the marine vessel on a display screen.

In addition to the sending and receiving of the speech and data described above, the control device 10 carries out power supply control of the wireless communication device 20 in accordance with a power operation of the control device 10 or a supply state of power from the power supply source. Specifically, in accordance with a power operation or the supply state of power from the power supply source, the control device 10 generates a sleep command commanding switching to a device-side sleep mode or a wake-up command commanding wake up from the device-side sleep mode, and sends the generated sleep command or wake-up command to the wireless communication device 20 to carry out the power supply control of the wireless communication device 20.

Figure 2:
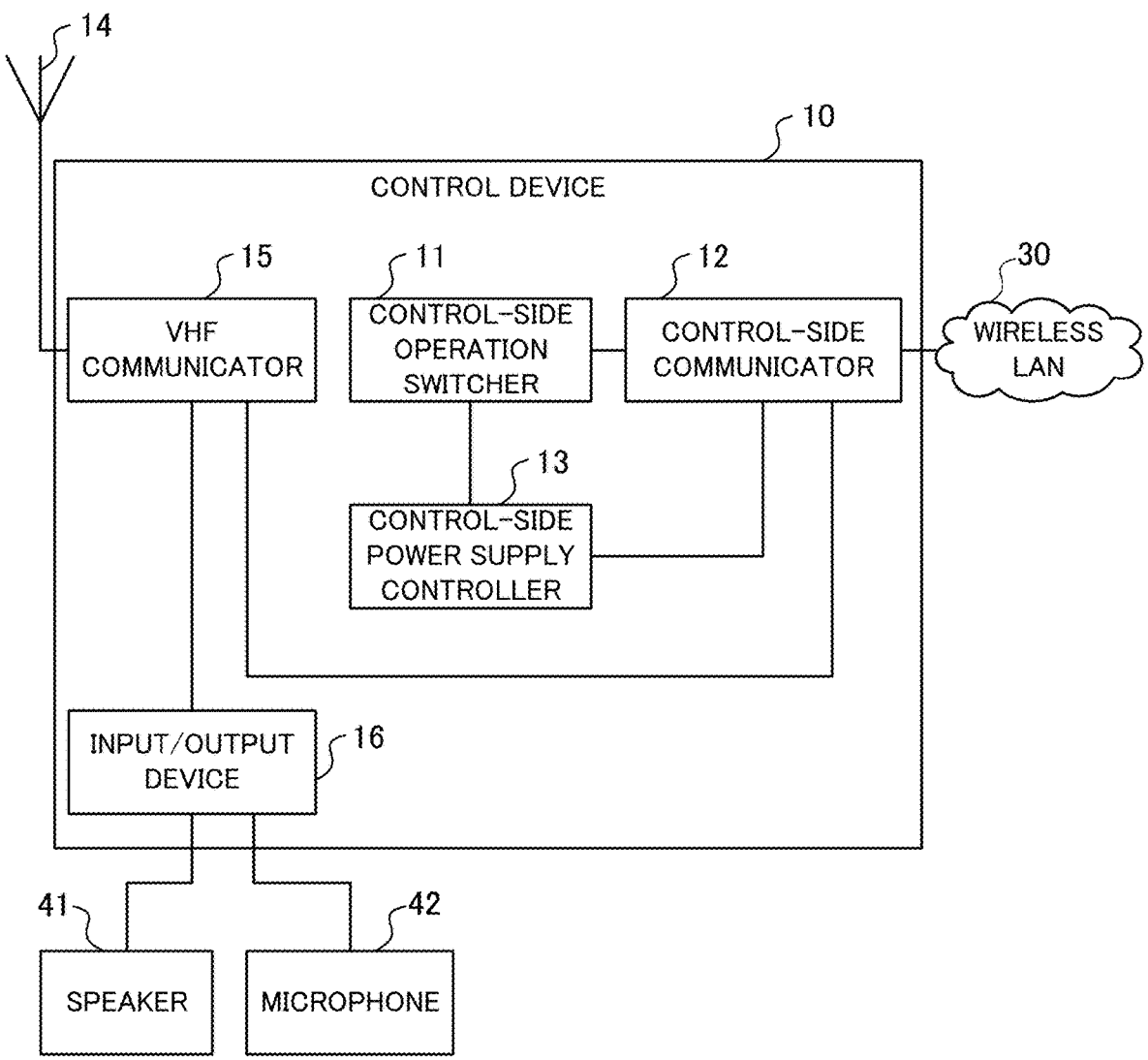
FIG. 2 is a block diagram illustrating the configuration of a control device according to the embodiment.

Next, the various components of the control device 10 are described in detail. As illustrated in FIG. 2, the control device 10 includes a control-side operation switcher 11 that switches between a control-side access point mode and a control-side station mode, a control-side communicator 12 that carries out communication with the wireless communication device 20, and a control-side power supply controller 13 that carries out the generation of the sleep command and the wake-up command and the switching between the control-side sleep mode and the control-side wake-up mode. In order to send and receive the VHF signal, the control device 10 includes a VHF antenna 14 that sends and receives the VHF signal, and a VHF communicator 15 that generates the VHF signal from sending data and extracts data from the VHF signals. Furthermore, the control device 10 includes an input/output device 16 that outputs the data extracted by the VHF communicator 15 and inputs/receives the sending data.

The control-side operation switcher 11 switches between the control-side access point mode and the control-side station mode in accordance with a power operation of the control device 10 or the supply state of power from the power supply source. The power operation of the control device 10 includes not only an operation of a power switch provided on a main body of the control device 10, but also includes automatic power operations set in advance in the control device 10 such as, for example, automatically powering OFF when the control device 10 has not been operated for a certain amount of time. In one example, the power supply source is a power supply system installed on a marine vessel. The control-side access point mode is a mode in which the control device 10 receives a connection request from the wireless communication device 20. The control-side station mode is a mode in which the control device 10 sends a connection request to the wireless communication device 20.

Specifically, when power ON of the control device 10 is commanded by the power operation, the control-side operation switcher 11 switches to the control-side station mode. In this case, when the mode immediately previous is the control-side station mode, switching to the control-side station mode means maintaining the control-side station mode. After sending of a wake-up command to the wireless communication device 20 in the control-side station mode, the control-side operation switcher 11 switches from the control-side station mode to the control-side access point mode.

When operating in the control-side access point mode, the control-side communicator 12 receives the connection request from the wireless communication device 20. Specifically, when a probe request that is a connection request from the wireless communication device 20 is received, the control-side communicator 12 sends a probe response that is a connection response. The probe response includes information for establishing a connection between the control device 10 and the wireless communication device 20 such as, for example, a Service Set ID (SSID). The control device 10 and the wireless communication device 20 hold, in advance, information about the Media Access Control (MAC) address of each other.

Thereafter, when the control-side communicator 12 receives an authentication request from the wireless communication device 20, the control-side communicator 12 sends an authentication response. Specifically, the control-side communicator 12 carries out 4-way handshake authentication procedures with the wireless communication device 20. After the authentication procedures are completed, when the control-side communicator 12 receives an Internet Protocol (IP) address request from the wireless communication device 20, the control-side communicator 12 sends an IP address response. As a result, an IP address is allocated to the wireless communication device 20, and a connection between the control device 10 and the wireless communication device 20 is established.

When operating in the control-side station mode, the control-side communicator 12 sends a connection request to the wireless communication device 20. Specifically, the control-side communicator 12 sends a probe request that is a connection request to the wireless communication device 20. Then, when the control-side communicator 12 receives a probe response that is a connection response from the wireless communication device 20, the control-side communicator 12 starts authentication procedures. Specifically, the control-side communicator 12 sends an authentication request to the wireless communication device 20. Then, when the control-side communicator 12 receives an authentication response from the wireless communication device 20, the control-side communicator 12 sends an IP address request. When the control-side communicator 12 receives an IP address response from the wireless communication device 20, an IP address is allocated to the control device 10, and a connection between the control device 10 and the wireless communication device 20 is established.

As described above, when the connection between the control device 10 and the wireless communication device 20 is established, sending and receiving of the sleep command, the wake-up command, the speech data, data not including speech such as, for example, position information, and the like between the control device 10 and the wireless communication device 20 is enabled. For example, the control-side communicator 12 generates a LAN frame that includes, in data fields, the sleep command, the wake-up command, the speech data, the data not including speech, or the like, and that conforms to the standard of the wireless LAN 30, and sends the LAN frame to the wireless communication device 20.

The sleep command includes the MAC address of the target device, that is, the wireless communication device 20, and commands switching of the wireless communication device 20 to the device-side sleep mode. As with a magic packet used in Wake on LAN (WoL), the wake-up command includes, for example, a data pattern consisting of 16 repetitions of the MAC address of the target device, that is, the wireless communication device 20. The wake-up command commands switching of the wireless communication device 20 to the device-side wake-up mode.

Additionally, in one example, the control-side communicator 12 receives the LAN frame sent from the wireless communication device 20. When the control-side communicator 12 acquires the LAN frame from the wireless communication device 20, the control-side communicator 12 extracts the speech data, the data not including speech, and the like included in the data fields. Then, the control-side communicator 12 sends, from among the extracted data and to the VHF communicator 15, data used in VHF communication such as the speech data, for example.

In accordance with the power operation or the supply state of power from the power supply source, the control-side power supply controller 13 carries out the generation of the sleep command or the wake-up command, and the switching between the control-side sleep mode and the control-side wake-up mode. The control-side sleep mode is a mode in which the supplying of power to the various components of the control device 10 is limited within a range in which the detection of power operations is possible. The control-side wake-up mode is a mode in which power is supplied to the various components of the control device 10. When power OFF of the control device 10 is commanded by a power operation, the control-side power supply controller 13 generates a sleep command and sends the generated sleep command to the control-side communicator 12. The control-side communicator 12 sends the sleep command to the wireless communication device 20 and, then, the control-side power supply controller 13 switches to the control-side sleep mode.

When power ON of the control device 10 is commanded by a power operation, the control-side power supply controller 13 generates a wake-up command and sends the generated wake-up command to the control-side communicator 12. Then, the control-side power supply controller 13 switches to the control-side wake-up mode.

The VHF communicator 15 carries out signal processing such as frequency conversion, amplification, filtering, demodulation, and the like of the VHF signal received by the VHF antenna 14 to extract the data from the VHF signal. The VHF communicator 15 sends the extracted data to the control-side communicator 12 and the input/output device 16. The VHF communicator 15 carries out signal processing such as modulation, filtering, amplification, frequency conversion, and the like of the sending data acquired from the control-side communicator 12 or the input/output device 16 to generate a VHF signal, and sends the VHF signal via the VHF antenna 14.

The input/output device 16 sends the data acquired from the VHF communicator 15 to the speaker 41. The speaker 41 plays back the speech included in the data acquired from the input/output device 16. The input/output device 16 sends the data acquired from the microphone 42 to the VHF communicator 15.

Figure 3:
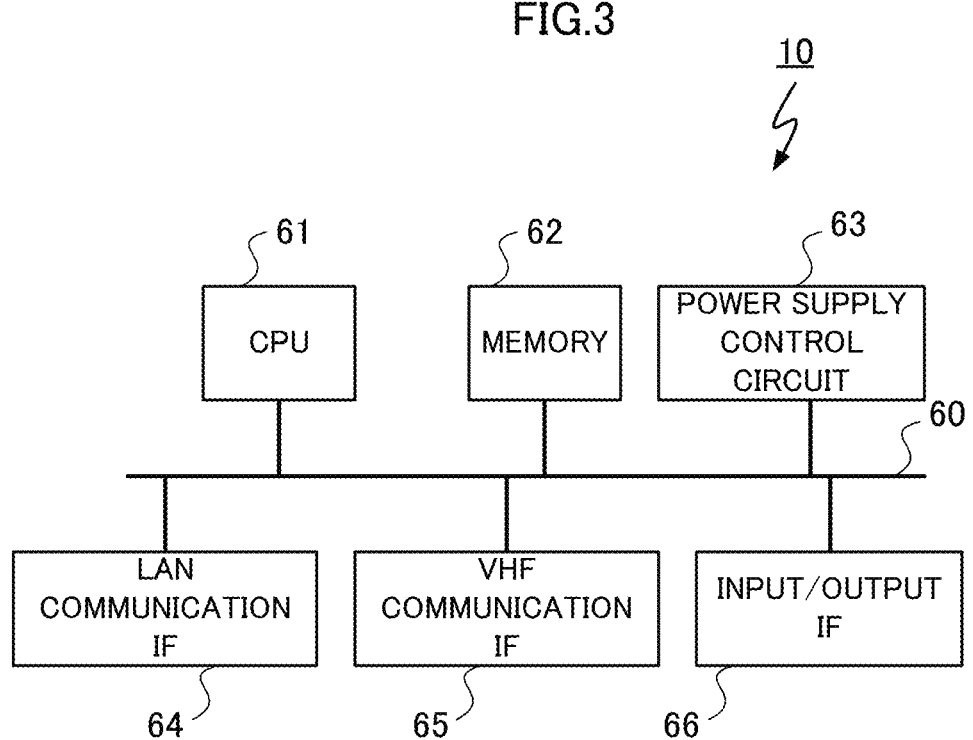
FIG. 3 is a block diagram illustrating the hardware configuration of the control device according to the embodiment.

An example of a hardware configuration for realizing the control device 10 illustrated in FIG. 2 is described using FIG. 3. The hardware configuration of the control device 10 includes a Central Processing Unit (CPU) 61, a memory 62, a power supply control circuit 63, a LAN communication Interface (IF) 64, a VHF communication IF 65, and an input/output IF 66. The CPU 61, the memory 62, the power supply control circuit 63, the LAN communication IF 64, the VHF communication IF 65, and the input/output IF 66 are connected to each other via a bus 60.

The CPU 61 executes a program stored in the memory 62 to realize the functions of the various components of control device 10. The power supply control circuit 63 is a circuit for realizing the functions of the control-side power supply controller 13, is supplied with power from the power supply source, and controls the supply of power to the various components of the control device 10. The LAN communication IF 64 is an interface that is connected to the wireless LAN 30 and is for enabling communication with the wireless communication device 20. The VHF communication IF

65 is an interface for enabling communication with other VHF radio stations. The control device 10 is connected to the speaker 41 and the microphone 42 via the input/output IF 66.

In the example of FIG. 3, the control device 10 includes one each of the CPU 61 and the memory 62, but a configuration is possible in which the control device 10 includes a plurality of the CPU 61 and a plurality of the memory 62. In such a case, the plurality of the CPU 61 and the plurality of the memory 62 may work together to realize the functions of the various components of the control device 10. In order to reduce power consumption, a configuration is possible in which the power supply control circuit 63 supplies power to only a portion of the plurality of the CPU 61 and supplies power to only a portion of the plurality of the memory 62.

Figure 4:
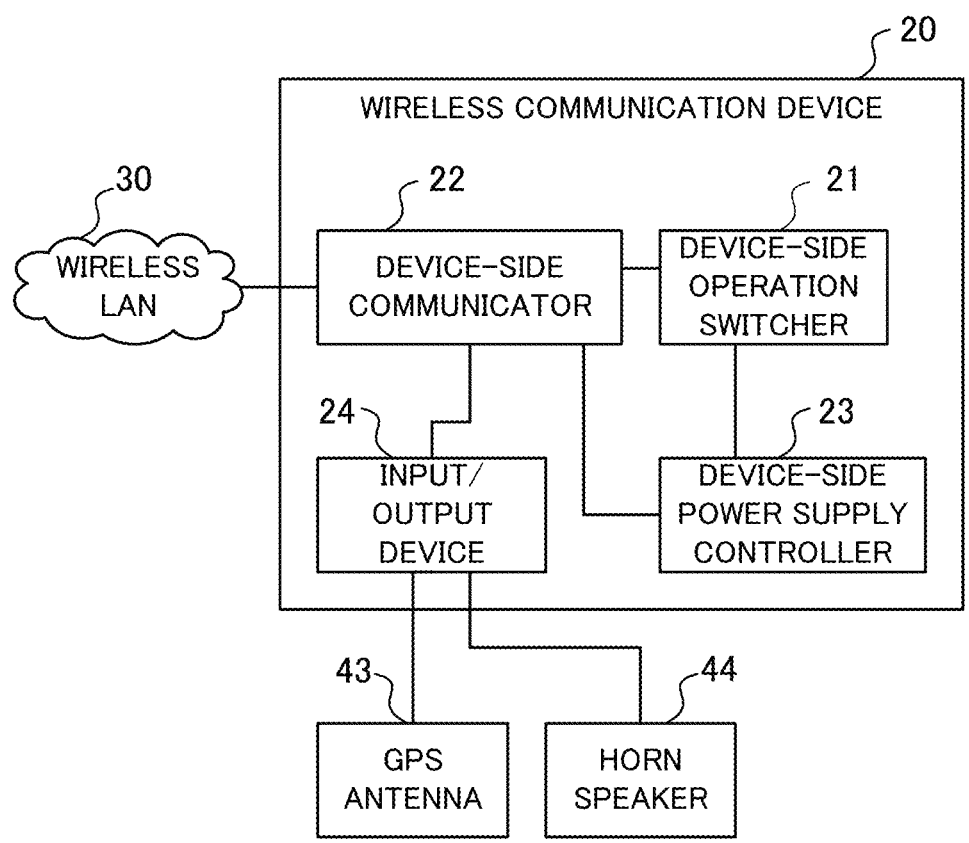
FIG. 4 is a block diagram illustrating the configuration of a wireless communication device according to the embodiment.

Next, details of the various components of the wireless communication device 20 that connects via the wireless LAN 30 to the control device 10 are described. As illustrated in FIG. 4, the wireless communication device 20 includes a device-side operation switcher 21 that switches between a device-side access point mode and a device-side station mode, a device-side communicator 22 that carries out communication with the control device 10, and a device-side power supply controller 23 that carries out switching between a device-side sleep mode and a device-side wake-up mode. Furthermore, the wireless communication device 20 includes an input/output device 24 that outputs data acquired by the device-side communicator 22, receives input of the sending data, acquires position information, and the like.

The device-side operation switcher 21 switches between the device-side access point mode and the device-side station mode in accordance with the supply state of power from the power supply source or a sleep command or a wake-up command sent from the control device 10. In one example, the power supply source is a power supply system installed on a marine vessel and is shared with the control device 10. The device-side access point mode is a mode in which the wireless communication device 20 receives a connection request from the control device 10. The device-side station mode is a mode in which the wireless communication device 20 sends a connection request to the control device 10.

Specifically, when a sleep command is sent from the control device 10 or when supplying of power is started from a state in which power is not being supplied from the power supply source, the device-side operation switcher 21 switches to the device-side access point mode. In such a case, when the mode immediately previous is the device-side access point mode, switching to the device-side access point mode means maintaining the device-side access point mode. When a wake-up command is sent from the control device 10, the device-side operation switcher 21 switches from the device-side access point mode to the device-side station mode.

When operating in the device-side access point mode, the device-side communicator 22 receives the connection request from the control device 10. Specifically, when the device-side communicator 22 receives a probe request that is a connection request from the control-side communicator 12 of the control device 10, the device-side communicator 22 sends a probe response that is a connection response. Then, when the device-side communicator 22 receives an authentication request from the control-side communicator 12, the device-side communicator 22 sends an authentication response. Specifically, the device-side communicator 22 carries out 4-way handshake authentication procedures with the control-side communicator 12. After the authentication procedures are completed, when the device-side communicator 22 receives an IP address request from the control-side communicator 12, the device-side communicator 22 sends an IP address response to the control-side communicator 12. As a result, an IP address is allocated to the control device 10, and a connection between the control device 10 and the wireless communication device 20 is established.

When operating in the device-side station mode, the device-side communicator 22 sends a connection request to the control-side communicator 12 of the control device 10. Specifically, the device-side communicator 22 sends a probe request that is a connection request to the control-side communicator 12. Then, when the device-side communicator 22 receives a probe response that is a connection response from the control-side communicator 12, the device-side communicator 22 starts authentication procedures. Specifically, the device-side communicator 22 sends an authentication request to the control-side communicator 12. Then, when the device-side communicator 22 receives an authentication response from the control-side communicator 12, the device-side communicator 22 sends an IP address request. When the device-side communicator 22 receives an IP address response from the control-side communicator 12, an IP address is allocated to the wireless communication device 20, and a connection between the control device 10 and the wireless communication device 20 is established.

As described above, when the connection is established between the control device 10 and the wireless communication device 20, sending and receiving of the sleep command, the wake-up command, the speech data, the data not including speech such as, for example, position information, and the like between the control device 10 and the wireless communication device 20 is enabled. In one example, the device-side communicator 22 generates a LAN frame that includes, in data fields, the speech data, the data not including speech, and the like, and that conforms to the standard of the wireless LAN 30, and sends the LAN frame to the control device 10.

Additionally, in one example, the device-side communicator 22 receives the LAN frame sent from the control device 10. When the device-side communicator 22 receives the LAN frame from the control device 10, the device-side communicator 22 extracts the sleep command, the wake-up command, the speech data, the data not including speech data, or the like included in the data fields. Then, the device-side communicator 22 sends the extracted sleep command or wake-up command to the device-side operation switcher 21 and the device-side power supply controller 23. The device-side communicator 22 sends the extracted speech data and data not including speech to the input/output device 24.

The device-side power supply controller 23 switches between the device-side sleep mode and the device-side wake-up mode in accordance with the supply state of power from the power supply source or the sleep command or the wake-up command sent from the control device 10. The device-side sleep mode is a mode in which the supply of power to the various components of the wireless communication device 20 is limited within a range in which connection requests from the control device 10 are receivable. The device-side wake-up mode is a mode in which power is supplied to the various components of the wireless communication device 20. When the device-side power supply controller 23 receives a sleep command from the device-side communicator 22 or when the supplying of power is started from a state in which power is not being supplied from the power supply source, the device-side power supply controller 23 switches to the device-side sleep mode.

When the device-side power supply controller 23 receives a wake-up command from the device-side communicator 22, the device-side power supply controller 23 switches to the device-side wake-up mode.

The input/output device 24 sends the position information acquired from the GPS antenna 43 to the device-side communicator 22. The input/output device 24 sends the data acquired from the device-side communicator 22 to the horn speaker 44. The horn speaker 44 plays back the speech included in the data acquired from the input/output device 24.

Figure 5:
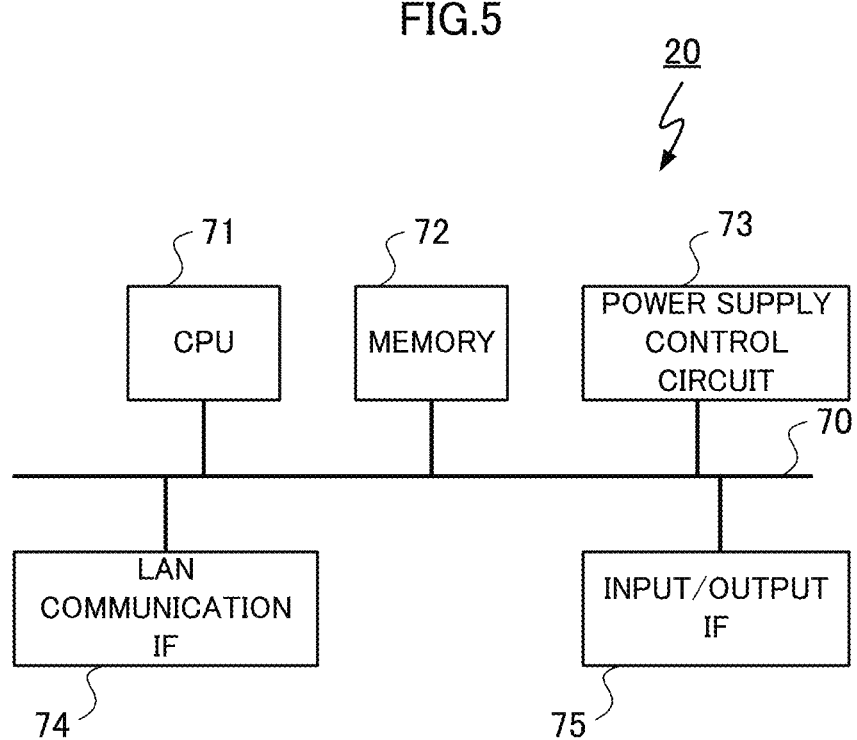
FIG. 5 is a block diagram illustrating the hardware configuration of the wireless communication device according to the embodiment.

Next, an example of a hardware configuration for realizing the wireless communication device 20 illustrated in FIG. 4 is described using FIG. 5. The hardware configuration of the wireless communication device 20 includes a CPU 71, a memory 72, a power supply control circuit 73, a LAN communication IF 74, and an input/output IF 75. The CPU 71, the memory 72, the power supply control circuit 73, the LAN communication IF 74, and the input/output IF 75 are connected to each other via a bus 70.

The CPU 71 executes a program stored in the memory 72 to realize the functions of the various components of wireless communication device 20. The power supply control circuit 73 is a circuit for realizing the functions of the device-side power supply controller 23, is supplied with power from the power supply source, and controls the supply of power to the various components of the wireless communication device 20. The LAN communication IF 74 is an interface that connects to the wireless LAN 30 and is for enabling communication with the control device 10. The wireless communication device 20 is connected to the GPS antenna 43 and the horn speaker 44 via the input/output IF 75.

In the example of FIG. 5, the wireless communication device 20 includes one each of the CPU 71 and the memory 72, but a configuration is possible in which the wireless communication device 20 includes a plurality of the CPU 71 and a plurality of the memory 72. In such a case, the plurality of the CPU 71 and the plurality of the memory 72 may work together to realize the functions of the various components of the wireless communication device 20. In order to reduce power consumption, a configuration is possible in which the power supply control circuit 73 supplies power to only a portion of the plurality of the CPU 71 and supplies power to only a portion of the plurality of the memory 72.

Next, a power supply control method carried out by the wireless system 1 that includes the control device 10 and the wireless communication device 20 is described.

Figure 6:
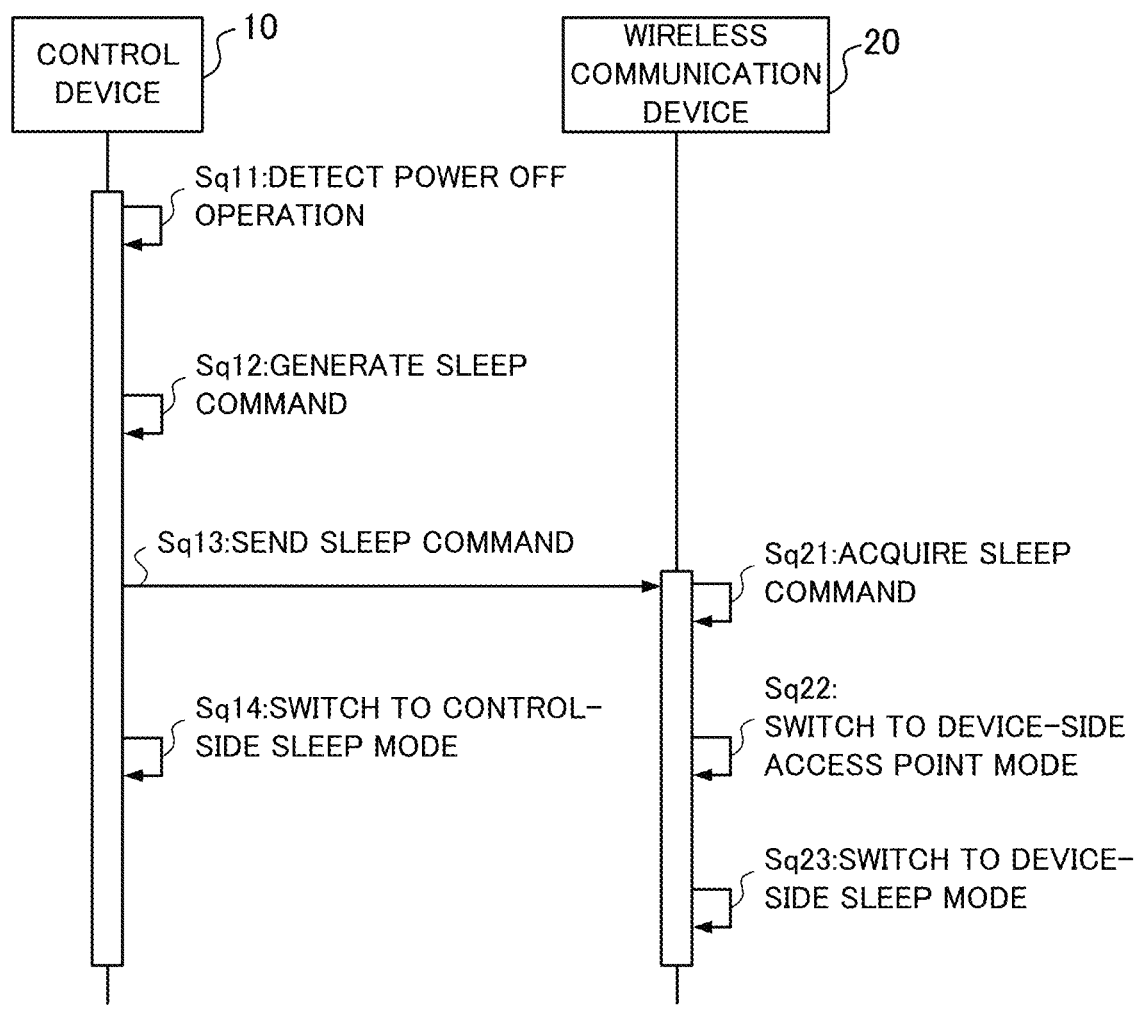
FIG. 6 is a sequence diagram illustrating an example of operations of power supply control carried out by the wireless system according to the embodiment.

A description is given, using FIG. 6, of control for remotely setting the wireless communication device 20 to the sleep state, specifically control for switching the wireless communication device 20 to the device-side sleep mode, when power OFF is commanded by a power operation of the control device 10. Prior to the power OFF of the control device 10 being commanded, there is a connection established between the control device 10 that is an access point and the wireless communication device 20 that is a station, and communication is being carried out between the control device 10 and the wireless communication device 20.

When the control-side power supply controller 13 of the control device 10 detects the power operation commanding the power OFF of the control device 10 (sequence Sq11), the control-side power supply controller 13 generates a sleep command (sequence Sq12). The control-side power supply controller 13 sends the generated sleep command to the control-side communicator 12. The control-side communicator 12 sends the sleep command generated in sequence Sq12 to the wireless communication device 20 (sequence Sq13). Specifically, the control-side communicator 12 generates a LAN frame including the sleep command in a data field, and sends the generated LAN frame to the wireless communication device 20.

When the processing of sequence Sq13 ends, the control-side power supply controller 13 switches to the control-side sleep mode (sequence Sq14). In the control-side sleep mode, the control-side power supply controller 13 supplies only the power needed to detect power operations, and does not supply power to the components of the control device 10 that are not used to detect power operations. For example, the power supply control circuit 63 supplies power only to the CPU 61 and the memory 62, and does not supply power to the LAN communication IF 64, the VHF communication IF 65, and the input/output IF 66. As a result, the power consumption of the control device 10 can be reduced.

The device-side communicator 22 of the wireless communication device 20 acquires the sleep command sent in sequence Sq13 (sequence Sq21). Specifically, the device-side communicator 22 receives the LAN frame sent from the control device 10, and extracts the sleep command included in the data field of the LAN frame. The device-side communicator 22 sends the extracted sleep command to the device-side operation switcher 21 and the device-side power supply controller 23.

The device-side operation switcher 21 switches to the device-side access point mode in accordance with the sleep command acquired in sequence Sq21 (sequence Sq22). By switching to the device-side access point mode, the device-side communicator 22 waits for a connection request from the control device 10.

When the processing of sequence Sq22 ends, the device-side power supply controller 23 switches to the device-side sleep mode (sequence Sq23). In the device-side sleep mode, the device-side power supply controller 23 supplies only power needed for the device-side communicator 22 in the device-side access point mode to wait for connection requests from the control device 10, and does not supply power to the components of the wireless communication device 20 that are not used to receive connection requests. For example, when a wireless LAN module included in the LAN communication IF 74 is capable of waiting for connection requests from the control device 10 alone, the power supply control circuit 73 supplies power only to the LAN communication IF 74 and the CPU 71, and does not supply power to the memory 72 and the input/output IF 75. In this case, it is preferable that the CPU 71 is in a sleep state. As a result, the power consumption of the wireless communication device 20 can be reduced.

As described above, the control device 10 switches to the control-side sleep mode and the wireless communication device 20 switches to the device-side sleep mode and, as a result, the power consumption of the wireless system 1 can be reduced. When the control device 10 is in the control-side sleep mode and the wireless communication device 20 is in the device-side sleep mode, the connection between the control device 10 and the wireless communication device 20 is cut off.

Figure 7:
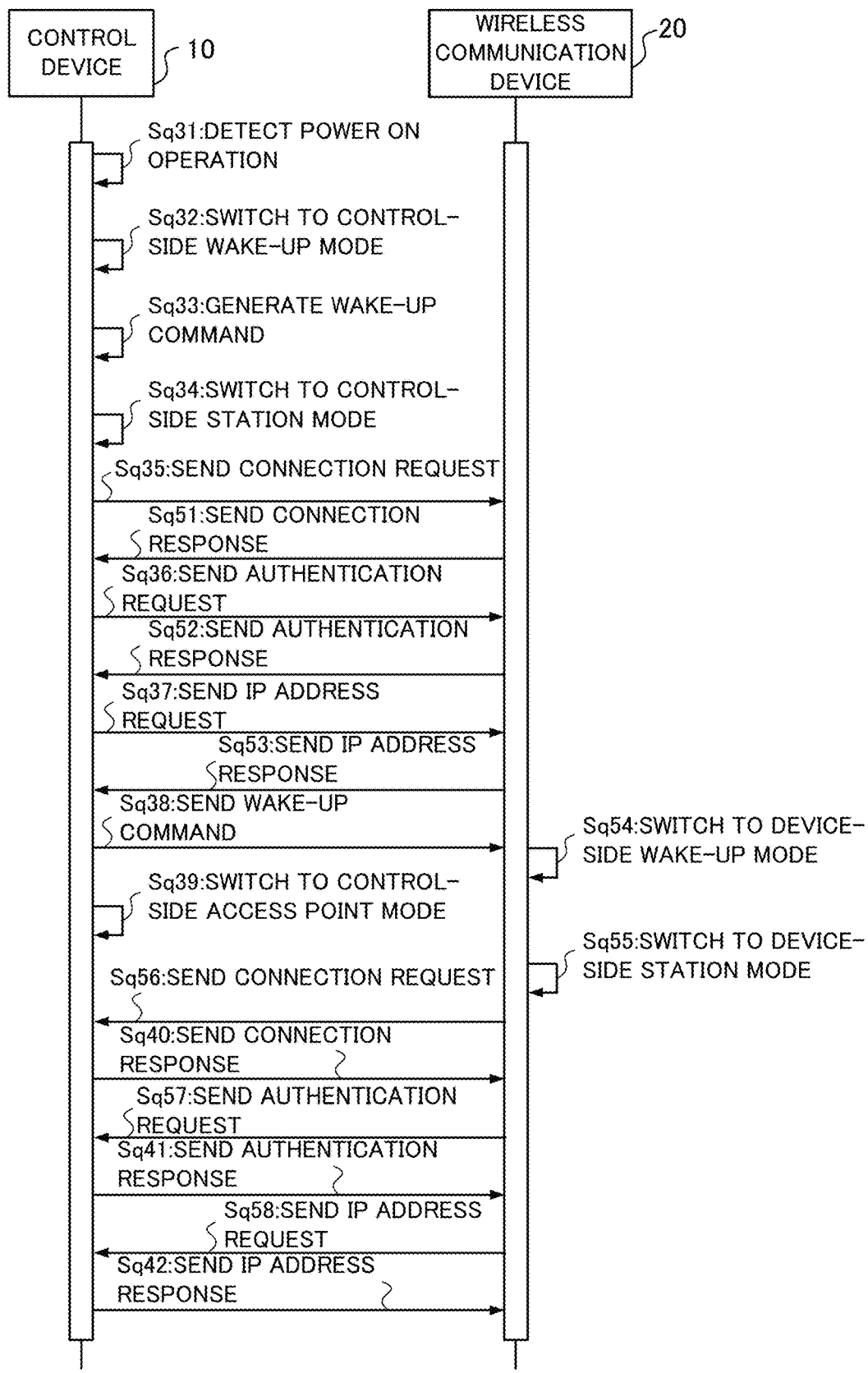
FIG. 7 is a sequence diagram illustrating an example of operations of the power supply control carried out by the wireless system according to the embodiment.

Next, a case is described, using FIG. 7, of control for remotely waking up the wireless communication device 20 when power ON of the control device 10 is commanded by a power operation in a state in which the control device 10 is in the control-side sleep mode and the wireless communication device 20 is in the device-side sleep mode. The control device 10 is waiting for a power operation in the control-side sleep mode, and the wireless communication device 20 is waiting for a connection request from the control device 10 in the device-side sleep mode.

When the control-side power supply controller 13 of the control device 10 detects a power operation commanding power ON of the control device 10 (sequence Sq31), the control-side power supply controller 13 switches from the control-side sleep mode to the control-side wake-up mode (sequence Sq32). Specifically, the control-side power supply controller 13 starts supplying power to the various components of the control device 10. Then, the control-side power supply controller 13 generates a wake-up command (sequence Sq33). The control-side power supply controller 13 sends the generated wake-up command to the control-side communicator 12.

When the processing of sequence Sq33 ends, the control-side operation switcher 11 switches from the control-side access point mode to the control-side station mode (sequence Sq34). When the processing of sequence Sq34 ends, the control-side communicator 12 sends a connection request to the wireless communication device 20 (sequence Sq35).

The device-side communicator 22 of the wireless communication device 20 operates in the device-side access point mode as described above and waits for the connection request from the control device 10. When the device-side communicator 22 receives the connection request sent in sequence Sq35, the device-side communicator 22 sends a connection response (sequence Sq51).

When the control-side communicator 12 receives the connection response sent in sequence Sq51, the control-side communicator 12 sends an authentication request to the wireless communication device 20 (sequence Sq36). When the device-side communicator 22 receives the authentication request sent in sequence Sq36, the device-side communicator 22 sends an authentication response (sequence Sq52). Specifically, the control-side communicator 12 and the device-side communicator 22 carry out 4-way handshake authentication procedures.

When the control-side communicator 12 receives the authentication response sent in sequence Sq52, the control-side communicator 12 sends an IP address request (sequence Sq37). When the device-side communicator 22 receives the IP address sent in sequence Sq37, the device-side communicator 22 sends an IP address response (sequence Sq53).

When the control-side communicator 12 receives the IP address response sent in sequence Sq53, a connection between the control device 10 that is a station and the wireless communication device 20 that is an access point is established. Then, the control-side communicator 12 sends the wake-up command generated in sequence Sq33 to the wireless communication device 20 (sequence Sq38). When the processing of sequence Sq38 ends, the control-side operation switcher 11 switches from the control-side station mode to the control-side access point mode (sequence Sq39).

When the device-side communicator 22 receives the wake-up command sent in sequence Sq38, the device-side communicator 22 sends the wake-up command to the device-side power supply controller 23. When the device-side power supply controller 23 acquires the wake-up command, the device-side power supply controller 23 switches to the device-side wake-up mode (sequence Sq54). Specifically, the device-side power supply controller 23 supplies power to the various components of the wireless communication device 20. When the processing of sequence Sq54 ends, the device-side operation switcher 21 switches from the device-side access point mode to the device-side station mode (sequence Sq55).

Due to the control-side operation switcher 11 switching to the control-side access point mode and the device-side operation switcher 21 switching to the device-side station mode, the connection between the control device 10 that is a station and the wireless communication device 20 that is an access point is cut off and, as such, reestablishing the connection between the control device 10 and the wireless communication device 20 is needed. As such, when the processing of sequence Sq55 ends, the device-side communicator 22 sends a connection request to the control device 10 (sequence Sq56).

Since the control-side communicator 12 is switched to the control-side access point mode in sequence Sq39, the control-side communicator 12 is waiting for a connection request from the wireless communication device 20. When the control-side communicator 12 receives the connection request sent in sequence Sq56, the control-side communicator 12 sends a connection response (sequence Sq40).

When the device-side communicator 22 receives the connection response sent in sequence Sq40, the device-side communicator 22 sends an authentication request to the control device 10 (sequence Sq57). When the control-side communicator 12 receives the authentication request sent in sequence Sq57, the control-side communicator 12 sends an authentication response (sequence Sq41). Specifically, the control-side communicator 12 and the device-side communicator 22 carry out 4-way handshake authentication procedures.

When the device-side communicator 22 receives the authentication response sent in sequence Sq41, the device-side communicator 22 sends an IP address request (sequence Sq58). When the control-side communicator 12 receives the IP address request sent in sequence Sq58, the control-side communicator 12 sends an IP address response (sequence Sq42). When the device-side communicator 22 receives the IP address response sent in sequence Sq42, a connection between the control device 10 that is an access point and the wireless communication device 20 that is a station is established.

Even when a connection between the control device 10 and the wireless communication device 20 is not established such as in the state in which the control device 10 is in the control-side sleep mode and the wireless communication device 20 is in the device-side sleep mode, as described above, the connection between the control device 10 and the wireless communication device 20 is reestablished as a result of a connection request being sent from the control device 10 to the wireless communication device 20. Moreover, it is possible to wake up the wireless communication device 20 by sending a wake-up command from the control device 10 to the wireless communication device 20.

Figure 8:
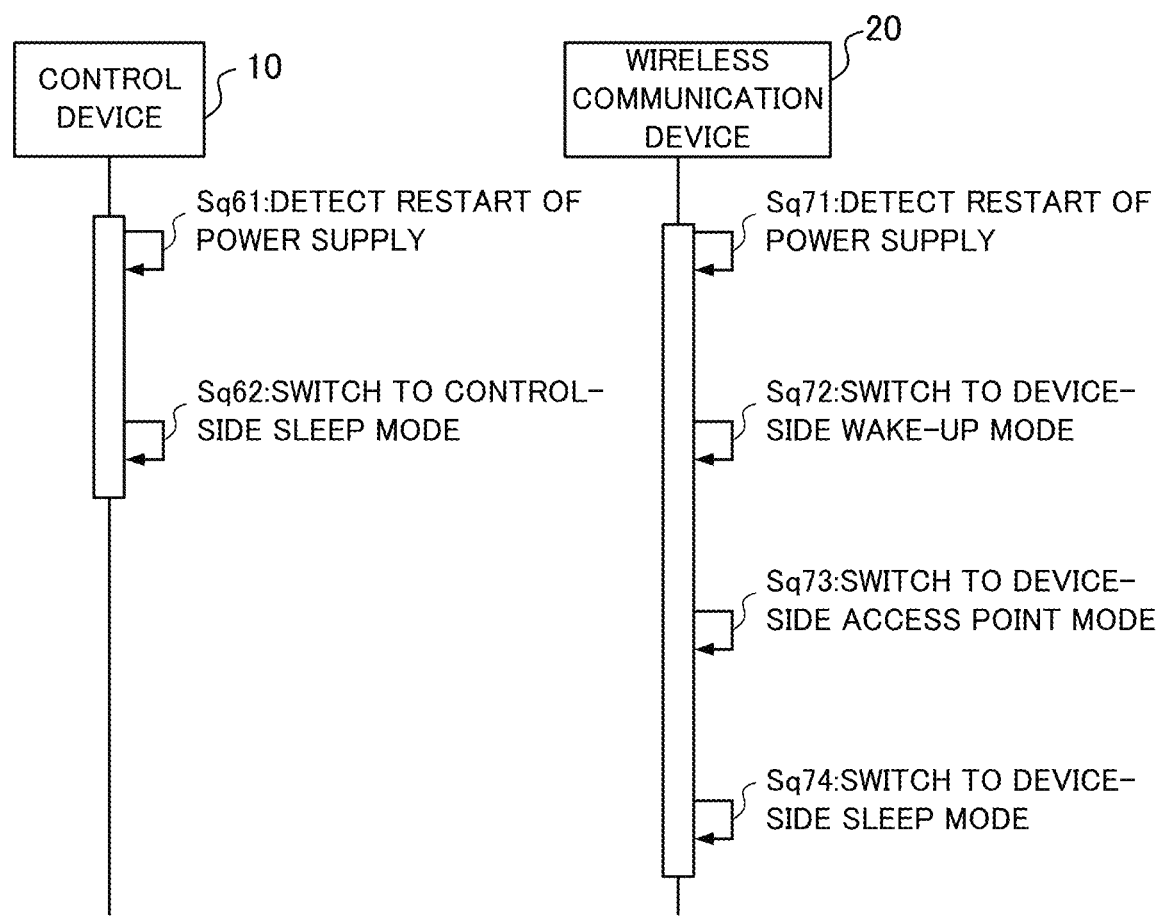
FIG. 8 is a sequence diagram illustrating an example of operations of the power supply control carried out by the wireless system according to the embodiment.

When a breaker, a switch or the like provided between the wireless system 1 and the power supply source is open due to the detection of overvoltage, for example, power is no longer supplied to the wireless system 1. When the supply of power to the wireless system 1 is cut off, the connection between the control device 10 and the wireless communication device 20 is cut off. Next, a description is given, using FIG. 8, of control for remotely powering ON the wireless communication device 20 after restarting the supply of power.

When the control-side power supply controller 13 of the control device 10 detects that the supplying of power is started from a state in which power is not being supplied from the power supply source (sequence Sq61), the control-side power supply controller 13 switches to the control-side sleep mode (sequence Sq62). The control-side power supply controller 13 can detect the presence/absence of the supply of power on the basis of the potential of the input terminal, for example. As an example, when the potential of the input terminal is higher than a reference value that is a value considered as indicating that power is being supplied, the control-side power supply controller 13 considers that power is being supplied.

When the device-side power supply controller 23 of the wireless communication device 20 detects that the supplying of power is started from a state in which power is not being supplied from the power supply source (sequence Sq71), the device-side power supply controller 23 switches to the device-side wake-up mode (sequence Sq72). Then, the device-side power supply controller 23 notifies the device-side operation switcher 21 that the supplying of power has started. The device-side operation switcher 21 receives the notification and switches to the device-side access point mode (sequence Sq73). In such a case, when the mode immediately previous is the device-side access point mode, switching to the device-side access point mode means maintaining the device-side access point mode. When the processing of sequence Sq73 ends, the device-side power supply controller 23 switches to the device-side sleep mode (sequence Sq74). Then, when a power ON command is input by a power operation of the control device 10, it becomes possible to remotely wake up the wireless communication device 20, as illustrated in FIG. 7.

As described above, the control device 10 of the wireless system 1 according to this embodiment switches between the control-side access point mode and the control-side station mode. After the connection with the wireless communication device 20 is cut off, the control device 10 operates in the control-side station mode, and sends a connection request to the wireless communication device 20 to establish a connection with the wireless communication device 20. After the connection is established, the control device 10 can send a wake-up command to the wireless communication device 20 to wake up the wireless communication device 20. When the control device 10 is operating in the control-side access point mode, the control device 10 receives a connection request from the wireless communication device 20 to establish a connection with the wireless communication device 20. After the connection is established, the control device 10 can send a sleep command to the wireless communication device 20 to switch the wireless communication device 20 to the device-side sleep mode.

Even when the connection between the control device 10 and the wireless communication device 20 is cut off, the connection between the control device 10 and the wireless communication device 20 can be reestablished due to the connection request being sent from the control device 10 to the wireless communication device 20 as described above. As a result, remote power supply control of the wireless communication device 20 is possible.

In the control-side sleep mode, power is supplied only to the components of the control device 10 needed to detect power operations and, in the device-side sleep mode, power is supplied only to the components of the wireless communication device 20 needed to wait for connection requests. As such, the power consumption of the wireless system 1 can be reduced.

The present disclosure is not limited to the embodiment described above. The hardware configurations and flowcharts described above are examples and can be changed or modified as desired.

Figure 9:
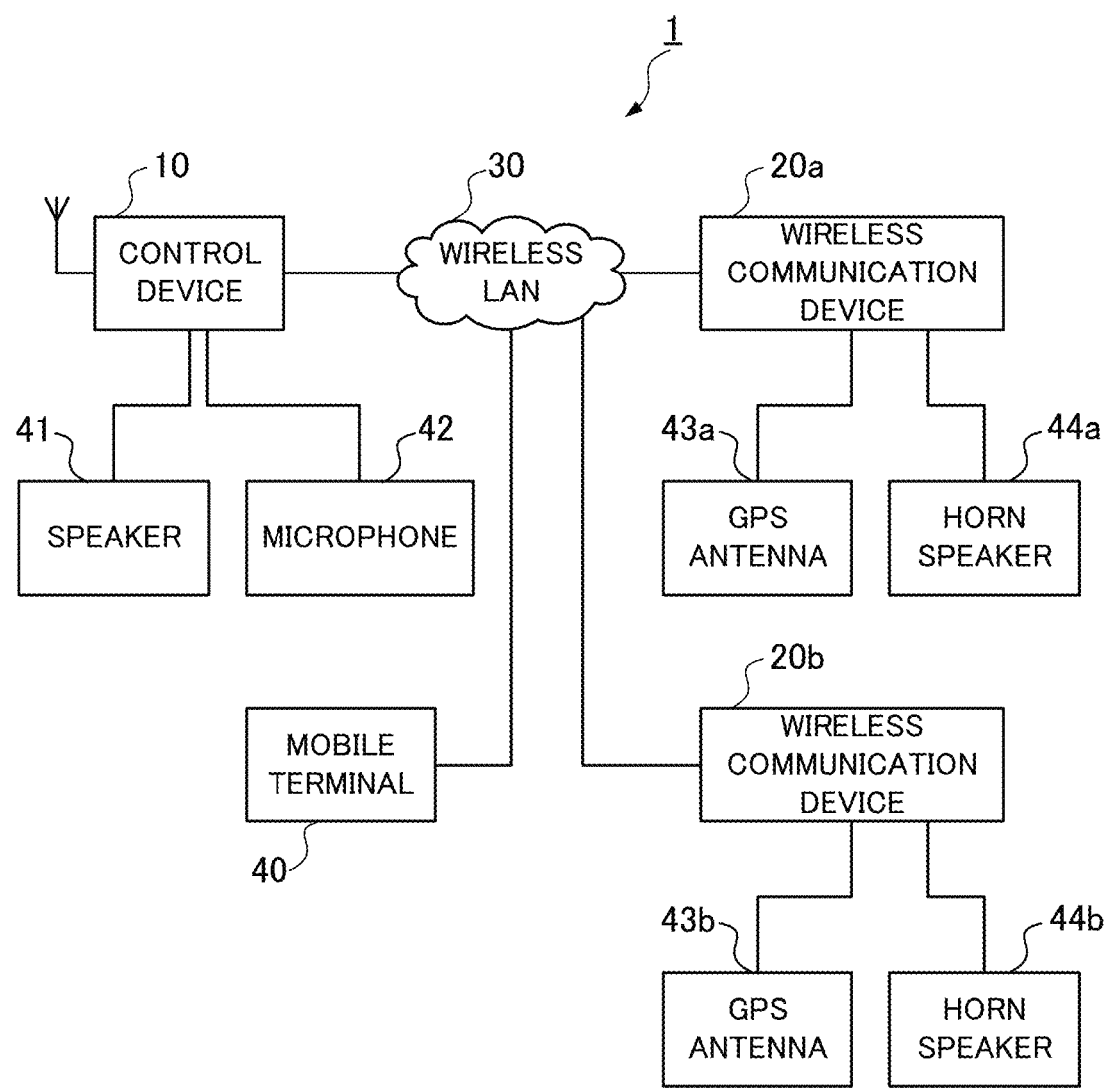
FIG. 9 is a block diagram illustrating the configuration of a wireless system according to a modified example of the embodiment.

As illustrated in FIG. 9, a configuration is possible in which the wireless system 1 includes a plurality of wireless communication devices 20a, 20b. The configurations and operations of the wireless communication devices 20a, 20b are the same as the wireless communication device 20. In this case, the control device 10 operating in the control-side access point mode may receive a connection request from each of the wireless communication devices 20a, 20b to establish a connection with each of the wireless communication devices 20a, 20b. When power OFF of the control device 10 is commanded by a power operation of the control device 10, the control-side communicator 12 may send a sleep command to each of the wireless communication devices 20a, 20b. After the sleep command has been sent to each of the wireless communication devices 20a, 20b, the control-side power supply controller 13 switches to the control-side sleep mode.

The control device 10 operating in the control-side station mode may send a connection request to each of the wireless communication devices 20a, 20b in order. Specifically, when power ON of the control device 10 is commanded by a power operation of the control device 10, the control-side communicator 12 first sends a connection request to the wireless communication device 20a and establish a connection with the wireless communication device 20a as described above. Then, the control-side communicator 12 sends a wake-up command to the wireless communication device 20a. When the control-side communicator 12 sends the wake-up command to the wireless communication device 20a, the connection with the wireless communication device 20a is cut off, and the control-side communicator 12 sends a connection request to the wireless communication device 20b to establish a connection with the wireless communication device 20b. Then, the control-side communicator 12 sends a wake-up command to the wireless communication device 20b. After sending a wake-up command to each of the wireless communication devices 20a, 20b, the control-side operation switcher 11 switches to the control-side access point mode.

Devices that are connectible to the control device 10 are not limited to the wireless communication devices 20, 20a, and 20b. As illustrated in FIG. 9, a configuration is possible in which a mobile terminal 40 connects to the control device 10 via the wireless LAN 30. In one example, the mobile terminal 40 is implemented as a smartphone, and can carry out remote operation of the control device 10, and can provide information such as atmospheric pressure, environment light, and the like to the control device 10.

Figure 10:
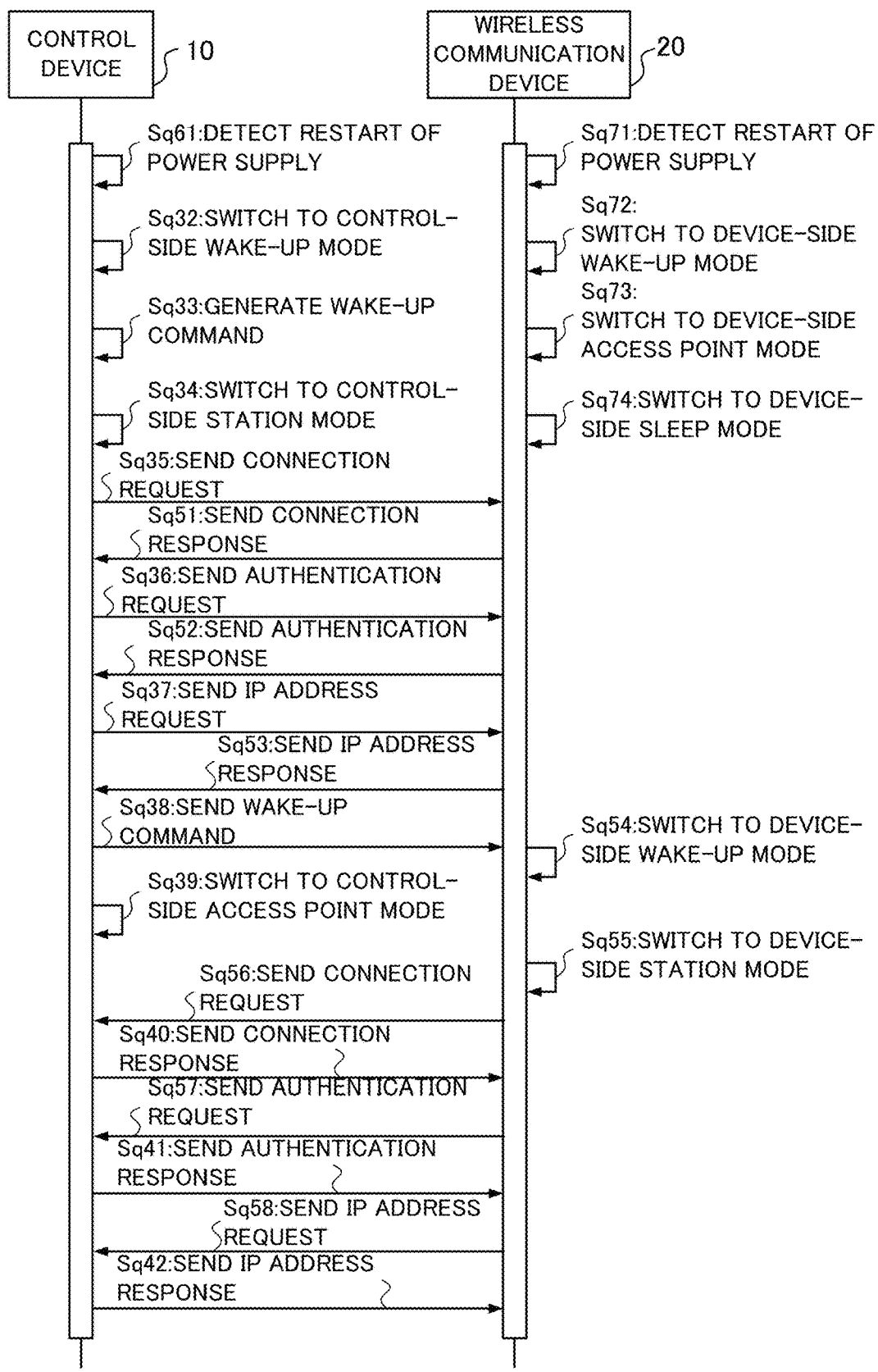
FIG. 10 is a sequence diagram illustrating an example of operations of the power supply control carried out by the wireless system according to the embodiment.

The control for remotely powering ON the wireless communication device 20 after restarting the supply of power is not limited to the example described above. A configuration is possible in which the control device 10 is woken up automatically as illustrated in FIG. 10 when the supplying of power is started from a state in which power is not being supplied from the power supply source. Sequence Sq61 of FIG. 10 is the same as the processing of sequence Sq61 of FIG. 8. When the control-side power supply controller 13 of the control device 10 detects that the supplying of power is started from a state in which power is not being supplied from the power supply source (sequence Sq61), the control device 10 carries out the processing from sequence Sq32 illustrated in FIG. 7. The processing of sequences Sq71 to Sq74 carried out by the wireless communication device 20 are the same as sequences Sq71 to Sq74 illustrated in FIG. 8. Then, when the connection request from the control device 10 is received, the processing from sequence Sq51 is carried out in the same manner as in FIG. 7. As a result, after the restarting of the supply of power, the control device 10 can be automatically woken up and the wireless communication device 20 can be remotely woken up.

The conditions for switching between the control-side access point mode and the control-side station mode are not limited to the examples described above. For example, a configuration is possible in which a notifications are sent at a set interval between the control device 10 and the wireless communication device 20 while there is a connection established between the control device 10 and the wireless communication device 20 and, if a notification is not obtained, the control device 10 switches to the control-side station mode and the wireless communication device 20 switches to the device-side access point mode. As a result, the connection between the control device 10 and the wireless communication device 20 can be reestablished.

The method for establishing a connection between the control device 10 and the wireless communication device 20 is not limited to the example described above, and any method may be used. In the embodiment described above, the control device 10 that is operating in the control-side access point mode waits for a connection request from the wireless communication device 20 without sending a beacon. However, a configuration is possible in which the control device 10 sends a beacon at a set interval. This also applies to the wireless communication device 20 that is operating in the device-side access point mode.

The control device 10 is not limited to a VHF radio station and may be a radio station that carries out communication on a desired frequency, or may be any other communication device that carries out wireless LAN communication.

The input/output device connected to the control device 10 is not limited to the example described above, and any input/output device may be used. A configuration is possible in which the input/output device 16 of the control device 10 acquires speech data from a microphone installed in the control device 10, and/or speech is output from a speaker installed in the control device 10.

The external device connected to the wireless communication device 20 is not limited to the example described above, and any external device may be used.

A configuration is possible in which the device-side operation switcher 21 switches between the device-side access point mode and the device-side station mode in accordance with a power operation of the wireless communication device 20. The power operation of the wireless communication device 20 includes not only an operation of a power switch provided on a main body of the wireless communication device 20, but also includes automatic power operations set in advance in the wireless communication device 20 such as, for example, automatically powering OFF when a state in which data cannot be acquired from the control device 10, for example, continues for a certain amount of time or longer.

The operations of the wireless communication device 20 when power OFF is commanded by a power operation of the wireless communication device 20 are the same as the operations when a sleep command is received from the control device 10. The operations of the wireless communication device 20 when power ON is commanded by a power operation of the wireless communication device 20 are the same as the operations when a wake-up command is received from the control device 10.

A configuration is possible in which the control device 10 and the wireless communication device 20 are each supplied with power from an independent power supply source.

The wireless system 1 is not limited to being installed on a marine vessel and may be installed on any vehicle. The wireless system 1 is not limited to a wireless system of a vehicle, and may be any wireless system.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A control device that controls a power supply of a wireless communication device connected across a wireless local area network, the control device comprising:
    a control-side operation switcher that, in accordance with a power operation or a supply state of power from a power supply source that supplies power to the control device, switches between a control-side access point mode for receiving a connection request from the wireless communication device and a control-side station mode for sending a connection request to the wireless communication device;
    a control-side power supply controller that, in accordance with the power operation or the supply state of the power from the power supply source, generates a sleep command commanding switching of the wireless communication device to a device-side sleep mode or a wake-up command commanding the wireless communication device to wake up from the sleep mode, and switches between a control-side sleep mode for limiting a supply of power within a range in which detection of the power operation is possible and a control-side wake-up mode; and
    a control-side communicator that receives a connection request from the wireless communication device in the control-side access point mode and sends a connection request to the wireless communication device in the control-side station mode to establish a connection with the wireless communication device, and sends, to the wireless communication device with which the connection is established, the sleep command or the wake-up command generated by the control-side power supply controller.

2. The control device according to claim 1, wherein
    when a power OFF of the control device is commanded by the power operation,
    the control-side power supply controller generates the sleep command,
    the control-side communicator sends, to the wireless communication device, the sleep command generated by the power supply controller, and
    after the control-side communicator sends the sleep command, the control-side power supply controller switches to the control-side sleep mode.

3. The control device according to claim 1, wherein
    when a power ON of the control device is commanded by the power operation, or supplying of power is started from a state in which power is not being supplied from the power supply source, the control-side power supply controller switches to the control-side wake-up mode and generates the wake-up command, the control-side operation switcher switches to the control-side station mode, after the control-side operation switcher switches to the control-side station mode, the control-side communicator sends the connection request to the wireless communication device and, when the connection with the wireless communication device is established, sends the wake-up command to the wireless communication device, and after the control-side communicator sends the wake-up command, the control-side operation switcher switches to the control-side access point mode.

4. The control device according to claim 2, wherein when a power ON of the control device is commanded by the power operation, or supplying of power is started from a state in which power is not being supplied from the power supply source, the control-side power supply controller switches to the control-side wake-up mode and generates the wake-up command, the control-side operation switcher switches to the control-side station mode, after the control-side operation switcher switches to the control-side station mode, the control-side communicator sends the connection request to the wireless communication device and, when the connection with the wireless communication device is established, sends the wake-up command to the wireless communication device, and after the control-side communicator sends the wake-up command, the control-side operation switcher switches to the control-side access point mode.

5. A wireless communication device in which a power supply is controlled by a control device connected across a wireless local area network, the wireless communication device comprising:

a device-side operation switcher that, in accordance with a supply state of power from a power supply source that supplies power to the wireless communication device or a sleep command commanding switching to a device-side sleep mode or a wake-up command commanding waking up from the sleep mode sent from the control device, switches between a device-side access point mode for receiving a connection request from the control device and a device-side station mode for sending a connection request to the control device;

a device-side communicator that receives a connection request from the control device in the device-side access point mode and sends a connection request to the control device in the device-side station mode to establish a connection with the control device, and receives, from the control device with which the connection is established, the sleep command or the wake-up command; and a device-side power supply controller that, in accordance with the supply state of the power from the power supply source or the sleep command or the wake-up command, switches between the device-side sleep mode for limiting a supply of power within a range in which receiving of the connection request from the control device is possible and a device-side wake-up mode.

6. The wireless communication device according to claim 5, wherein when the device-side communicator receives the sleep command from the control device, the device-side operation switcher switches to the device-side access point mode, and after the device-side operation switcher switches to the device-side access point mode, the device-side power supply controller switches to the device-side sleep mode.

7. The wireless communication device according to claim 5, wherein when the device-side communicator receives the wake-up command from the control device, the device-side power supply controller switches to the device-side wake-up mode, and when the device-side power supply controller switches to the device-side wake-up mode, the device-side operation switcher switches to the device-side station mode.

8. The wireless communication device according to claim 6, wherein when the device-side communicator receives the wake-up command from the control device, the device-side power supply controller switches to the device-side wake-up mode, and when the device-side power supply controller switches to the device-side wake-up mode, the device-side operation switcher switches to the device-side station mode.

9. The wireless communication device according to claim 5, wherein when supplying of power is started from a state in which power is not being supplied from the power supply source, the device-side power supply controller switches to the device-side wake-up mode, the device-side operation switcher switches to the device-side access point mode, and after the device-side operation switcher switches to the device-side access point mode, the device-side power supply controller switches to the device-side sleep mode.

10. The wireless communication device according to claim 6, wherein when supplying of power is started from a state in which power is not being supplied from the power supply source, the device-side power supply controller switches to the device-side wake-up mode, the device-side operation switcher switches to the device-side access point mode, and after the device-side operation switcher switches to the device-side access point mode, the device-side power supply controller switches to the device-side sleep mode.

11. The wireless communication device according to claim 7, wherein when supplying of power is started from a state in which power is not being supplied from the power supply source, the device-side power supply controller switches to the device-side wake-up mode, the device-side operation switcher switches to the device-side access point mode, and after the device-side operation switcher switches to the device-side access point mode, the device-side power supply controller switches to the device-side sleep mode.

12. The wireless communication device according to claim 8, wherein when supplying of power is started from a state in which power is not being supplied from the power supply source, the device-side power supply controller switches to the device-side wake-up mode, the device-side operation switcher switches to the device-side access point mode, and after the device-side operation switcher switches to the device-side access point mode, the device-side power supply controller switches to the device-side sleep mode.

13. A wireless system, comprising:

a control device that controls a power supply of a wireless communication device connected across a wireless local area network, the control device comprising:

a control-side operation switcher that, in accordance with a power operation or a supply state of power from a power supply source that supplies power to the control device, switches between a control-side access point mode for receiving a connection request from the wireless communication device and a control-side station mode for sending a connection request to the wireless communication device;

a control-side power supply controller that, in accordance with the power operation or the supply state of the power from the power supply source, generates a sleep command commanding switching of the wireless communication device to a device-side sleep mode or a wake-up command commanding the wireless communication device to wake up from the sleep mode, and switches between a control-side sleep mode for limiting a supply of power within a range in which detection of the power operation is possible and a control-side wake-up mode; and a control-side communicator that receives a connection request from the wireless communication device in the control-side access point mode and sends a connection request to the wireless communication device in the control-side station mode to establish a connection with the wireless communication device, and sends, to the wireless communication device with which the connection is established, the sleep command or the wake-up command generated by the control-side power supply controller; and at least the wireless communication device in which a power supply is controlled by a control device connected across a wireless local area network, the wireless communication device comprising:

a device-side operation switcher that, in accordance with a supply state of power from a power supply source that supplies power to the wireless communication device or a sleep command commanding switching to a device-side sleep mode or a wake-up command commanding waking up from the sleep mode sent from the control device, switches between a device-side access point mode for receiving a connection request from the control device and a device-side station mode for sending a connection request to the control device;

a device-side communicator that receives a connection request from the control device in the device-side access point mode and sends a connection request to the control device in the device-side station mode to establish a connection with the control device, and receives, from the control device with which the connection is established, the sleep command or the wake-up command; and a device-side power supply controller that, in accordance with the supply state of the power from the power supply source or the sleep command or the wake-up command, switches between the device-side sleep mode for limiting a supply of power within a range in which receiving of the connection request from the control device is possible and a device-side wake-up mode.

14. A power supply control method performed by a wireless system including a wireless communication device and a control device connected over a wireless local area network, the method being for controlling a power supply of the wireless communication device, the method comprising:

in accordance with a power operation of the control device or a supply state of power from a power supply source that supplies power to the control device, sending a sleep command commanding switching to a device-side sleep mode to the wireless communication device from the control device that is operating in a control-side access point mode for receiving a connection request from the wireless communication device;

when the wireless communication device operating in a device-side station mode for sending a connection request to the control device receives the sleep command, switching the wireless communication device to a device-side access point mode for receiving a connection request from the control device, and switching the wireless communication device to the device-side sleep mode;

in accordance with the power operation of the control device or the supply state of the power from the power supply source, sending a wake-up command commanding wake up from the device-side sleep mode to the wireless communication device from the control device operating in a control-side station mode for sending a connection request to the wireless communication device; and when the wireless communication device operating in the device-side access point mode receives the wake-up command, switching the wireless communication device to the device-side station mode and switching the wireless communication device to the device-side wake-up mode.

\* \* \* \* \*